United States Patent [19]

Stromswold et al.

[11] 4,247,939
[45] Jan. 27, 1981

[54] SPREAD SPECTRUM DETECTOR

[75] Inventors: Chester E. Stromswold, Nashua; John T. Apostolos, Manchester, both of N.H.

[73] Assignee: Sanders Associates, Inc., Nashua, N.H.

[21] Appl. No.: 959,397

[22] Filed: Nov. 9, 1978

[51] Int. Cl.³ .................. H04B 1/10; H04B 12/00; H04B 15/02
[52] U.S. Cl. ............................ 375/1; 375/102; 375/103; 455/303; 455/307; 455/308
[58] Field of Search ............ 325/323, 332, 333, 334, 325/349, 371, 435, 436, 363, 473, 474, 477, 482; 324/77 C, 77 D; 328/144; 375/1, 96, 102, 103; 455/26, 28, 131, 303, 306, 307, 308

[56] References Cited

U.S. PATENT DOCUMENTS

| | | | |
|---|---|---|---|
| 2,954,465 | 9/1960 | White | 325/333 |
| 3,020,477 | 2/1962 | Lewinstein | 324/77 C |
| 3,112,452 | 11/1963 | Kirkpatrick | 325/477 |
| 3,381,243 | 4/1968 | Darlington | 325/332 |
| 3,858,117 | 12/1974 | Denny | 325/435 |

FOREIGN PATENT DOCUMENTS 2549021 3/1975 Fed. Rep. of Germany .......... 455/210

Primary Examiner—Howard A. Birmiel
Attorney, Agent, or Firm—Louis Etlinger; Ronald Reichman

[57] ABSTRACT

A spread spectrum detector utilizes compressive receiver techniques and squaring of the incoming signal to detect the presence of a spread spectrum signal and to obtain its center frequency, with the squaring cancelling the pseudo-random code. Once having determined the center frequency, the gated output of the compressive receiver's dispersive delay line may be directly demodulated without resort to code correlation, by applying the output of the dispersive delay line to a narrowband filter set to the detected center frequency. Narrowband interfering signals are rejected by a continuous comb filter, hard limiters for the filter outputs and a summing device. The same narrowband signal rejection can be accomplished by hard limiting the output of the compressive receiver delay line and then returning to the time domain with an additional dispersive delay line having a dispersive characteristic inverse to that of the compressive receiver delay line. Pseudo-random quadrature phase shifts may be cancelled out by raising the incoming signal to the fourth power.

14 Claims, 3 Drawing Figures

SPREAD SPECTRUM DETECTOR

FIELD OF INVENTION

This invention relates to spread spectrum detectors and more particularly, to a method and apparatus for detecting the presence of "direct sequence" spread spectrum signals.

BACKGROUND OF THE INVENTION

Spread spectrum signals have been utilized in the past for secure communications due to the pseudo-random coding employed and the fact that the spread out signals are barely above the noise level. Because of the spread spectrum and the manner in which that signal is generated, it is difficult to either detect the presence of this spread spectrum signal or to demodulate the signal without foreknowledge of the particular pseudo-random phase shift code.

One type of spread spectrum signal is called a "direct sequence" spread spectrum signal. This signal is generated by rapidly changing the phase of a narrowband signal from 0° to 180° in a pseudo-random known fashion. The effect of pseudo-randomly varying the phase of the signal is to spread out the frequency spectrum of the original signal in a sin x/x fashion. The pseudo-random phase changes are coded such that a predetermined series of phase changes are made to occur, with both the sender and the recipient knowing the code. The code might, for instance, involve shifting from a phase of 0° to 180° at a time $T_1$ and then shifting back to 0° phase 1 microsecond later; with a further phase shift to 180° 3 microseconds later, etc.

It will be noted that the spread in frequency of the signal is such that the spread spectrum bandwidth is 1/minimum code length. In the above example, the minimum code length would be 1 microsecond and the signal is therefore spread out to a bandwidth of 1 MHz.

What is accomplished by spreading out the signal in this manner is to make the signal appear just above the noise level. For an individual knowing the exact pseudo-random code, the individual can set his receiver so as to change phase exactly in time with the transmitted signal. Once having done this, the pseudo-random phase changes are cancelled out which results in the signal being brought out of the noise. The recipient can then demodulate the remaining signal, assuming that the modulation rate is much slower than the pseudo-random code rate.

It will be appreciated that the direct sequence spread spectrum technique is utilized so as to defeat those who would wish to listen in on the signal. It has been found that it ispossible to both detect the presence and center frequency of a spread spectrum signal and to demodulate the signal without foreknowledge of the code or code correlation techniques. This involves squaring to cancel the pseudo-random code and restore the original signal. Once having squared the incoming signal, part of the invention is the use of compressive receiver technology to detect the presence of spread spectrum signals and their center frequency. Once having detected the center frequency, demodulation is accomplished after narrowband filtering is set to the detected center frequency. A further part of the subject invention involves techniques for rejecting narrowband high power interfering signals by dividing up the frequency band of interest into bins and by hard limiting the signals in each bin, followed by summation of all of the hard limited signals.

PSEUDO-RANDOM CODE CANCELLATION

Pseudo-random code cancellation is accomplished through the recognition that if a sine wave is squared, the result is that the frequency is doubled and the phase angle is doubled. With this observation, note that the doubling of 0° is 0°. Note also that the doubling of 180° is 360°=0°. Therefore, by squaring the incoming signal, the pseudo-random phase shifts due to direct sequence spread spectrum transmission are cancelled so that the original signal is restored. This technique has been used in narrowband PSK demodulation to obtain a subcarrier, but has never been used to detect spread spectrum signals or demodulate them primarily because of the hitherto low signal-to-noise ratios(SNR) obtainable by squaring alone. Part of this invention involves the use of a narrowband filter coupled to the squaring circuit and set to the center frequency of the detected spread spectrum signal, which raises the SNR sufficient for adequate demodulation.

It should be noted that the same technique can be used for quadrature phase shifts in which the pseudo-random shifts are 0°; 90°; 180°; and 270°. Cancelling out quadrature phase shifts is accomplished by utilizing a network which raises the incoming signal to the fourth power. The result is the same in that the pseudo-randomly generated phase shift is cancelled and what is left is a signal which can now be processed for center frequency and/or demodulated.

In the past, the compressive receiver has been used to rapidly sweep a frequency band to detect the presence of narrowband signals and their frequency. Here the compressive receiver is used to detect the presence of spread spectrum signals and their center frequency. In general, the compressive receiver heterodynes the incoming signal with a signal from a swept local oscillator and after suitable weighting, applies the heterodyned signal to a dispersive delay line. Should signals be present in the output of the dispersive delay line at any given time with respect to the sweep of the local oscillator, then it is possible to identify that an incoming signal exists at a predetermined frequency based on when in the sweep of the local oscillator the signal at the output of the dispersive delay line exists. Compressive receivers have thus been utilized to sweep certain frequency bands of interest to identify the existence of a signal and its frequency. However, compressive receivers have not been utilized to detect spread signals.

Assuming that the swept local oscillator utilized sweeps at a rate of S Hz per second, it is a finding of this invention that by squaring the heterodyned output and applying it to a dispersive delay line which has a rate of 2S Hz per second or twice that of the local oscillator, then the pseudo-random phase coding is cancelled and the compressed pulse position indicates the center frequency of the signal. It will be appreciated that by squaring the incoming signal which doubles its frequency, it is important to double the sweep rate of the delay line to accommodate the doubled frequency when a dispersive delay line is desired. Of course, raising the signal to the fourth power results in a quadrupling of the frequency of the signal and thus, a dispersive delay line having a rate which is four times that of the local oscillator is required.

LIMITING OF NARROWBAND INTERFERENCE

It will be appreciated that since spread spectrum signals lie very near the noise level, detection of the spread spectrum signal is difficult in environments in which narrowband high power signals exist. In order to remove the effect of narrowband high power signals, in one embodiment of the subject invention a contiguous comb filter is utilized, the output of which is a set of frequencies (each set corresponding to a frequency bin) and signals in each frequency bin are hard limited so as to reduce the masking effect of the narrowband high power signal. The outputs of the hard limiters are summed and applied to a squaring circuit and a dispersive delay line operating at twice the local oscillator sweep rate. This effectively eliminates the effect of the narrowband high power signals because the spread spectrum signal has power uniformly distributed across the spread spectrum band, whereas a narrowband signal has all of its energy concentrated at one frequency (e.g., in one frequency bin). By hard limiting the signals in each frequency bin and then summing the hard limited signals, all the energy in the spread spectrum signal will be recovered in the process, but only a fraction of the narrowband energy will be recovered because it has been hard limited.

It should be noted that the spread spectrum signal strength is so close to the noise level that the limiter will have virtually no effect on the spread spectrum signal. The result is that in the summation, all of the spread spectrum signal energy is integrated to raise it above the noise level, whereas only a fraction of the narrowband signal energy is integrated. This system therefore selects those signals which have approximately equal energy distributed across a large number of frequency bins. What will be appreciated is that this is exactly the discrimination system required to detect the spread spectrum signal.

After this type of discrimination the squaring circuit removes the aforementioned phase coding and the twice sweep rate dispersive delay output can then be conventionally demodulated.

This same type of discrimination against narrowband high power signals can be accomplished by applying the output of a compressive receiver to a hard limiter and then to a dispersive delay line having a dispersive characteristic inverse to that of the delay line in the compressive receiver. If the delay line in the compressive receiver has a rate equal to S Hz per second, then limiting the output of this dispersive delay line and applying it to a dispersive delay line having a rate $-S$ Hz per second returns the signal to the time domain. As in the previous example, the output of the last-mentioned dispersive delay line is squared and then applied to a further dispersive delay line having a rate of 2S per second.

This embodiment eliminates the necessity of a continuous comb filter and obtains frequency domain limiting by utilizing a conventional time domain limiter at the output of a compressive receiver. This limited signal is brought to the sweep frequency domain by a second matching dispersive delay line. It will be appreciated that the first-mentioned dispersive delay line, along with the swept local oscillator and the heterodyning circuit comprise, in general, what is conceived of as being a compressive receiver. What is therefore necessary is merely to utilize a conventional compressive receiver, limit its output and provide a matching dispersive delay line along with a squaring circuit and a twice sweep rate dispersive delay line in order to detect the spread spectrum signal and its center frequency.

It is therefore an object of this invention to provide a method and apparatus for detecting the presence of spread spectrum signals and their center frequency;

it is another object of this invention to provide a system for demodulating spread spectrum signals by squaring and narrowband filtering in which the filter is set to the center frequency of the spread spectrum signal;

it is another object of this invention to provide a spread spectrum signal detector in which narrowband high power interfering signals can be cancelled.

These and other objects of the invention can be better understood in light of the following description in combination with the drawings in which:

DETAILED DESCRIPTION

By way of background, in general, the compressive receiver is one which employs a linear variable frequency local oscillator. This oscillator is swept such that its signal, when mixed with an incoming signal, should one be present, produces a linear FM signal. The linear FM signal is coupled to a dispersive delay line which time compresses the linear signal. When the output of the dispersive delay line is displayed as a function of time, the position of the compressed pulse on the time axis correlates to the frequency of the incoming signal. In order to demodulate the output of the dispersive delay line, the local oscillator must be swept sufficiently fast compared with the modulation rate on the signal so that the signal can be fully demodulated. In pseudo-random spread spectrum signals the modulation rate is significantly lower than the pseudo-random phase reversal rate so that once the spread is removed by the squaring technique described above, conventional dispersive delay lines and swept local oscillators may be utilized to demodulate spread spectrum signals.

Figure 1:
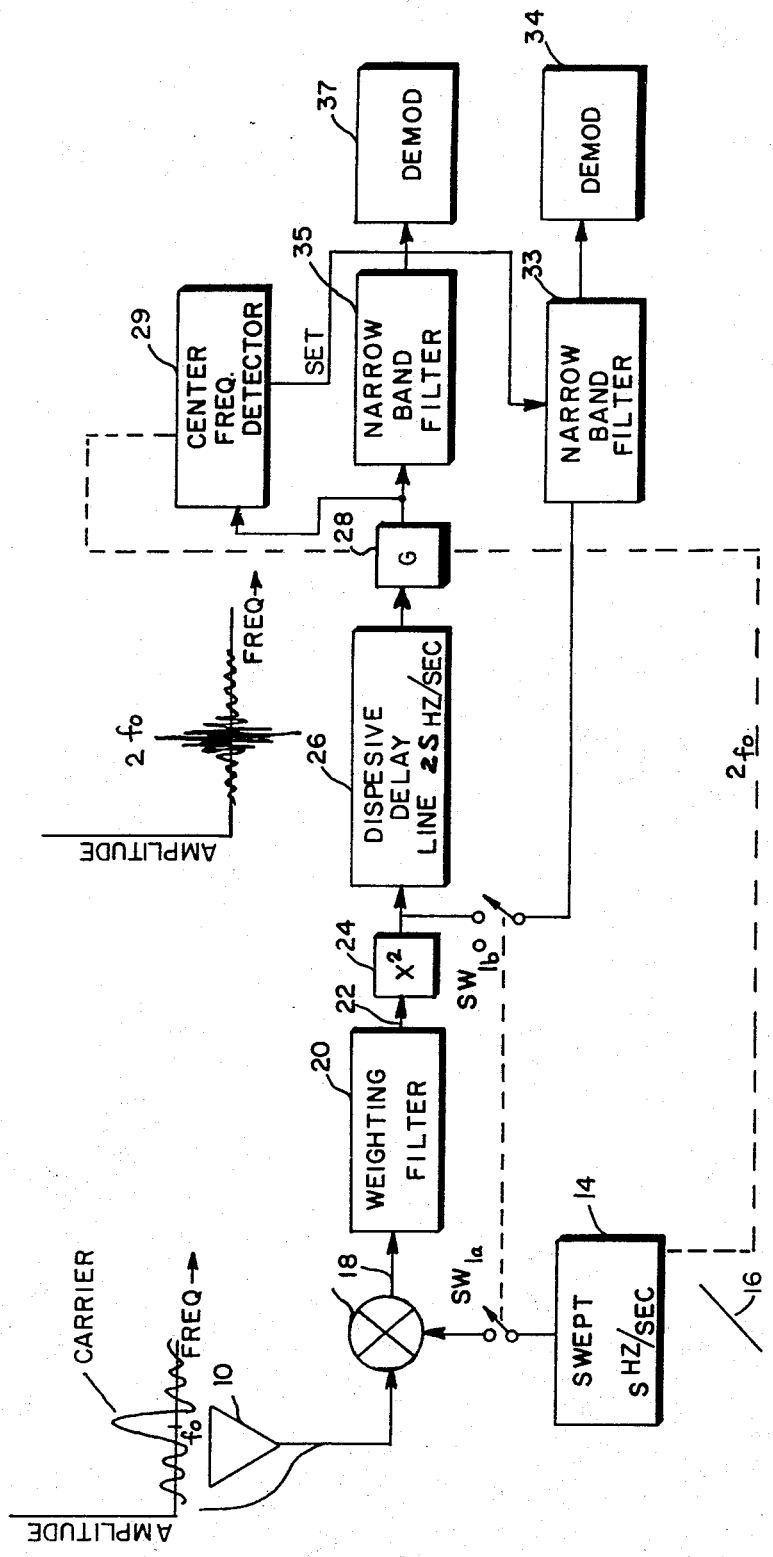
FIG. 1 is a schematic and block diagram of the subject Spread Spectrum Detector.

Referring now to FIG. 1, in one embodiment the spread spectrum detector includes an antenna 10 coupled to a conventional mixer 12 which is also coupled via switch $SW_{1a}$ to a linear variable frequency local oscillator 14 which is swept in a periodic fashion as illustrated by ramp 16. One type variable frequency oscillator utilizable with the subject invention is described in U.S. Pat. No. 3,382,460 issued to D. Blitz et al. on May 7, 1968, incorporated herein by reference. Note that the sin x/x spread spectrum signal is illustrated in the graph above antenna 10.

The output of the mixer is applied over line 18 to a conventional weighting network or filter 20 which has a bandwidth commensurate with the band swept by the variable frequency oscillator. This network is a Gaussian shaped frequency filter to reduce the side lobe level down to 60 dB below the main lobe which increases the dynamic range of the system. The network does this by applying Gaussian weighting in the frequency domain to the incoming signals. The output of the weighting network is applied over a line 22 to a conventional squaring network 24 which raises the incoming signal to the second power and doubles its frequency while at the same time removing the sin x/x spread in the frequency spectrum. The result is as illustrated by the graph of the output of the squaring circuit. The output of the squaring circuit is applied to a dispersive delay line 26. The delay line, in one embodiment, is an ultrasonic delay line and it is dispersive in the sense that its delay changes with frequency. However, unlike conventional compressive receivers the rate of the dispersive delay line 26 is twice that of the rate at which the variable frequency oscillator 14 is swept. The reason for this is that the squaring network doubles the frequency of the incoming signal.

The output of dispersive delay line 26 is gated by a conventional gating circuit 28 to a center frequency detection circuit 29. The gate is activated in timed relationship to the sweep of local oscillator 14, such that the opening of gate 28 corresponds to twice the frequency to which oscillator 14 is tuned at a known time during the sweep. If a signal appears at the output of gate 28, then it is known that a spread spectrum signal of a given center frequency is present.

The presence of a signal at a given frequency may be detected and recorded by center frequency detector 29 which may merely comprise a threshold detector and circuitry for recording the frequency of the swept local oscillator when a signal exists over the level set by the threshold detector. This may be accomplished via the sync signal which opens gate 28 at a predetermined time in the sweep of the local oscillator.

Once the center frequency of the spread spectrum signal is ascertained, a conventional tunable narrowband filter 33 can be set. This filter has a bandwidth only sufficiently wide enough to pass the expected modulation. Filter 33 is coupled to the output of circuit 24 and its purpose is to permit demodulation of the output signal from the squaring circuit by a conventional demodulator 34. It will be appreciated that while squaring circuit 24 removes the phase code and in most cases, restores the original narrowband signal from which the spread spectrum signal was derived, the signal-to-noise ratio for demodulating the output signal from the squaring circuit is low. The "set-on" narrowband filter increases the signal-to-noise ratio sufficiently for demodulation of the signal from squaring circuit 24 with switch $SW_1$ in position shown by switch $SW_{1b}$. Thus, once the center frequency of the spread spectrum signal is ascertained and the filter is set, it is possible to directly demodulate the output of the squaring circuit. In this case no linear swept oscillator is used. It is also possible to demodulate the output of gate 28 by providing a narrowband filter 35 and demodulator 37, with filter 35 tuned to the center frequency of delay line 26.

Figure 2:
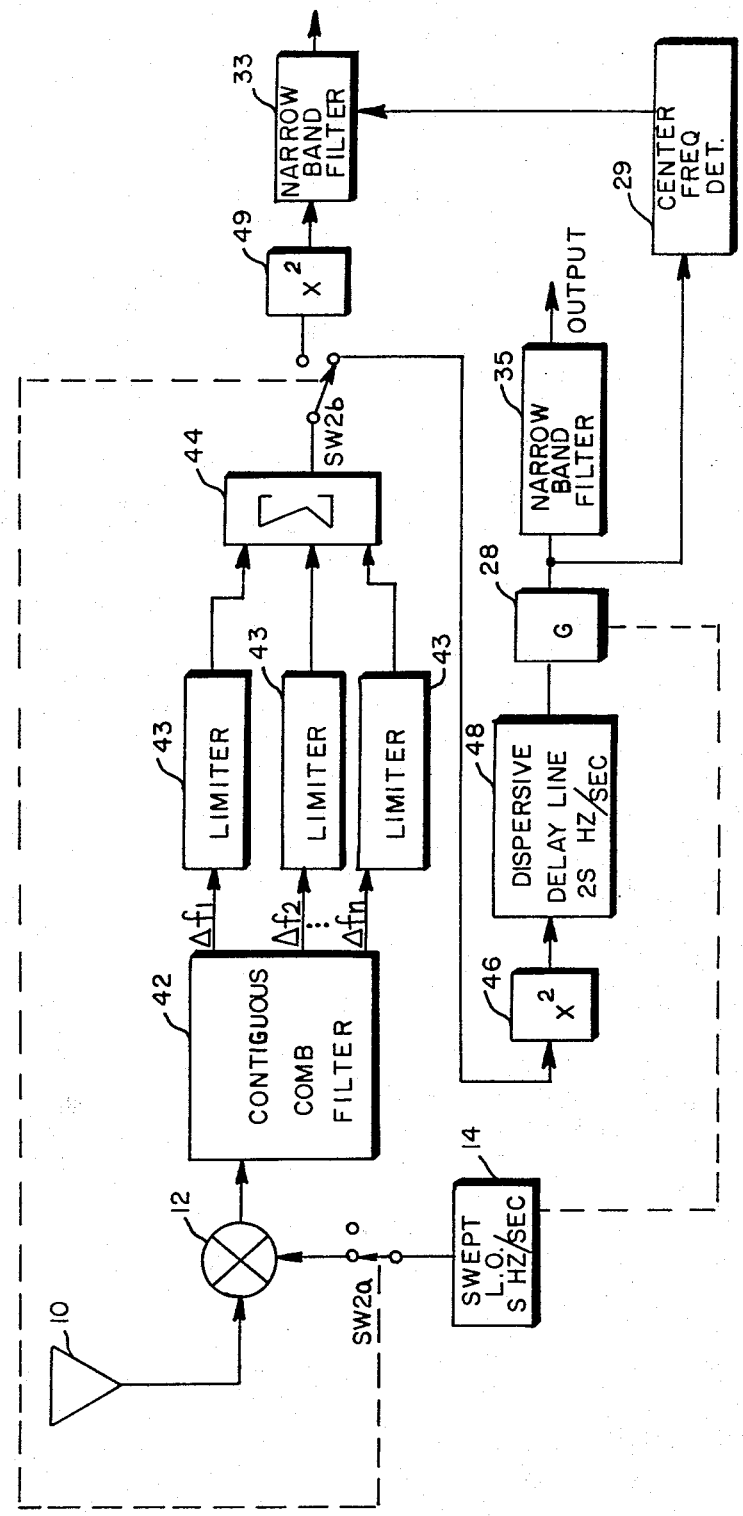
FIG. 2 is a schematic and block diagram of a Spread Spectrum Detector utilizing a contiguous comb filter and limiters for the elimination of interference in spread spectrum detection.

As will be appreciated, the system in FIG. 1 to a certain extent is degraded by strong narrowband signals. Referring to FIG. 2, a system is shown for eliminating the effect of high-power narrowband signals. The illustrated system utilizes a contiguous comb filter 42, the purpose of which is to divide up a given frequency band into a large number of contiguous frequency bands called "bins". These bins have a finite width. As such, the bins are designated $f_1, f_2, \ldots f_n$. Each of the frequency bins has associated with it a conventional hard limiter 43, the purpose of which is to clip all the signals above a predetermined threshold near the noise level so as to remove high power narrowband signals from consideration. The outputs of limiters 43 are coupled to a conventional summing circuit 44, the output of which is applied through switch $SW_{2b}$ to a squaring circuit 46 and a dispersive delay line 48 which has a rate which is twice that of swept local oscillator 14.

The system of FIG. 2 operates by, in essence, subdividing weighting filter 20 of FIG. 1 into subbands, each with its own limiter. This approximates frequency domain limiting and additionally prevents narrowband signals from degrading the efficiency of the squaring process over the entire weighting filter bandwidth.

As mentioned hereinbefore, the spread spectrum signal has power uniformly distributed across the spread spectrum band, whereas a narrowband signal has all of its energy concentrated at one frequency. By limiting all of the signals from the contiguous comb filter and then summing them together, all of the energy in the spread spectrum signal can be recovered in the process, but only a fraction of the narrowband energy will be recovered because it has been limited. As to the setting of the limiters, it has been noted that the spread spectrum signal strength is so close to the noise level that the limiter will have no effect on the spread spectrum signal even when set very close to the noise level. The result is that in the summation, all of the spread spectrum signal energy is integrated to raise it considerably above the noise level whereas only a fraction of the narrowband signal energy is integrated because the narrowband signal only occupies one of a great number of frequency bins. The squaring operates as before to eliminate pseudo-random phase coding and the output of delay line 48 may be demodulated as mentioned hereinbefore. As such, the output of gate 28 may be demodulated by utilization of narrowband filter 35 set to the center frequency of delay line 48. Note, with switch $SW_{2a}$ and $SW_{2b}$, it is possible to switch the swept local oscillator and dispersive delay line out of the system. Thus, the contiguous comb filter limiters and summing circuit can be used independently of compressive receiver technology. In this case, the output of summing circuit 44 may be coupled via switch $SW_{2b}$ to squaring circuit 49, the output of which may be demodulated by coupling it through "set-on" narrowband filter 33. As before, filter 33 is set by center frequency detector 29.

Figure 3:
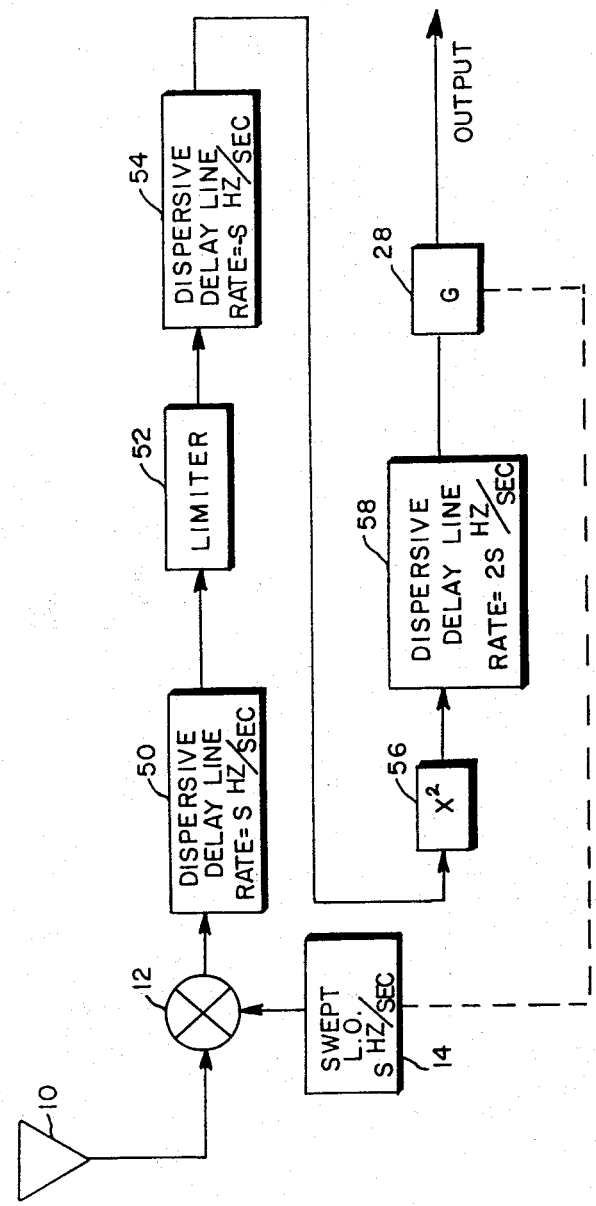
FIG. 3 is a schematic and block diagram of a Spread Spectrum Detector in which narrowband high-power interference is eliminated through the use of a limiter and a dispersive delay line which has a dispersive characteristic inverse to that of the dispersive delay line in the compressive receiver.

If it is inconvenient to utilize a contiguous comb filter such as that illustrated in FIG. 2, referring to FIG. 3 frequency domain limiting may be accomplished by utilizing a conventional time domain limiter at what would be the output of a conventional compressive receiver. Antenna 10, mixer 12, variable frequency oscillator 14, and dispersive delay line 50 are considered parts of the conventional compressive receiver, with the rate of dispersive delay line equaling that of the variable frequency local oscillator 14. The output of dispersive line 50 is coupled to a conventional hard limiting circuit 52 which is set just above the noise level as indicated hereinabove. The output of limiter 52 is applied to a dispersive delay line 54 having a dispersive characteristic inverse to that of line 50. Thus, the limited signal is brought back to the time domain by the second dispersive delay line. The rate for the second dispersive delay is −S Hz/sec such that the compressed signal at the output of dispersive delay line 50 which contains all the frequencies in compressed form is expanded again by the second dispersive delay line, with the narrowband high-power signals limited. The output of dispersive delay line 54 is squared at 56, thereby rendering direct sequence spread spectrum signals phase continuous at twice the sweep rate. The signal from the squaring unit is then integrated by the twice sweep rate line 58 to provide an indication of the presence of a spread spectrum signal and its center frequency. As before, the output of squaring circuit 56 may be coupled to a "set-on" narrowband filter and then may be coupled to a conventional demodulation unit. Alternatively, the output of delay line 58 may be coupled to a narrowband filter set to the center frequency of delay line 58, so as to permit demodulation.

Although preferred embodiments of the invention have been described in considerable detail for illustrative purposes, many modifications will occur to those skilled in the art. It is therefore desired that the protection afforded by Letters Patent be limited only by the true scope of the appended claims.

We claim:

1. Apparatus for detecting spread spectrum signals comprising:
   an antenna;
   a swept local oscillator;
   means for heterodyning the output of said local oscillator with a signal at said antenna;
   means for squaring the output signal from said heterodyning means;
   a dispersive filter having a rate twice that of said local oscillator, said filter being coupled to the output of said squaring means, and means for gating the output from said filter in timed relationship to the sweep of said local oscillator, whereby the presence and center frequency of a direct sequence spread spectrum signal may be ascertained.

2. The apparatus of claim 1 and further including a tuneable narrowband filter coupled to the output of said squaring means, and means for tuning said narrowband filter responsive to the detected center frequency of said spread spectrum signal, whereby said spread spectrum signal may be demodulated.

3. The apparatus of claim 1 and further including a narrowband filter coupled to the output of said gating means and set to the center frequency of said dispersive filter thereby to permit demodulation of said spread spectrum signal.

4. The apparatus of claim 1 and further including means coupled to said heterodyning means for dividing up into contiguous subbands the frequency band determined by the sweep of said local oscillator; means for hard limiting the signals in each of the subbands; and means for summing the hard limited signals in said subbands so that the effect of narrow band high power signals on the detection of spread spectrum signals are minimized.

5. Apparatus for ascertaining the presence and center frequency of a direct sequence spread spectrum signal comprising:
   an antenna, a swept local oscillator, means for heterodyning the output of said local oscillator with a signal at said antenna, means for squaring the output signal from said heterodyning means, dispersive filter means having a rate twice that of said swept local oscillator, said filter being coupled to the output of said squaring means, and means for gating the output signal from said filter means in timed relationship to the sweep of said local oscillator.

6. The apparatus claimed in claim 5 further including an apparatus for demodulating a direct sequence spread spectrum signal comprising:
   a narrowband filter coupled to the output of said squaring means and set to the center frequency of said spread spectrum signal; and
   means for detecting the modulation on the output signal from said narrowband filter.

7. The apparatus claimed in claim 5 further including an apparatus for minimizing the effect of narrowband high-power signals on the detection of spread spectrum signals comprising:
   means for dividing up into contiguous subbands a frequency band covering that in which said spread spectrum signal is expected to exist;
   means for hard limiting the signals in each of said subbands; and
   means for summing the hard limited signals in said subbands.

8. The apparatus in claim 7 wherein said dividing means includes a dispersive delay line having a rate of S Hz/sec. coupled to the output of said heterodyning means, said dispersive delay line being coupled to the output of said hard limiting means, and wherein said summing means includes a second dispersive delay line coupled to the output of said hard limiting means and having a rate of −S Hz/second.

9. The apparatus of claim 7 wherein said frequency band dividing means includes a contiguous comb filter.

10. A method of minimizing the effect of narrowband high-power signals on the detection of spread spectrum signals comprising:
    receiving a band of signals having varying frequencies;
    sweeping said frequency band;
    heterodyning said swept signal with said received signal;
    squaring said heterodyned signal;
    filtering said squared signal at a rate which is double the rate in which said band is swept;
    gating said filtered signal;
    dividing the frequency of said gated signal into contiguous subbands;
    hard limiting the signals in each of the subbands; and
    summing the hard limited signals in the subbands.

11. The method of claim 10 wherein the dividing step includes heterodyning an incoming signal with a frequency swept signal and delaying the heterodyned signal in a dispersive manner such that the delay is a function of frequency.

12. The method of claim 11 wherein the hard limiting step includes the step of hard limiting the delayed heterodyned signals.

13. The method of claim 12 wherein the summing step includes delaying the hard limited signals in a dispersive manner such that the delay is a function of frequency and the rate is inverse to that of the first delaying step.

14. Apparatus for ascertaining the presence and center frequency of a direct sequence spread spectrum signal comprising:
    an antenna, a swept local oscillator, means for heterodyning the output of said local oscillator with a signal at said antenna, means for raising the output signal from said heterodyning means to the fourth power; dispersive filter means having a rate four times that of said swept local oscillator, said filter being coupled to the output of said fourth power means, and means for gating the output signal from said filter means in timed relationship to the sweep of said local oscillator.

* * * * *

UNITED STATES PATENT OFFICE
CERTIFICATE OF CORRECTION

PATENT NO. : 4,247,939
DATED : January 27, 1981
INVENTOR(S) : Stromswold and Apostolos It is certified that error appears in the above-identified patent and that said Letters Patent are hereby corrected as shown below:

In Block 26 of Fig. 1 the word "Dispesive" should be "Dispersive".

A character number 12 should be placed next to the empty lead line in Fig. 1 near character 18.

Signed and Sealed this

Sixteenth Day of June 1981

[SEAL]

Attest:

RENE D. TEGTMEYER

Attesting Officer     Acting Commissioner of Patents and Trademar